United States Patent Office.

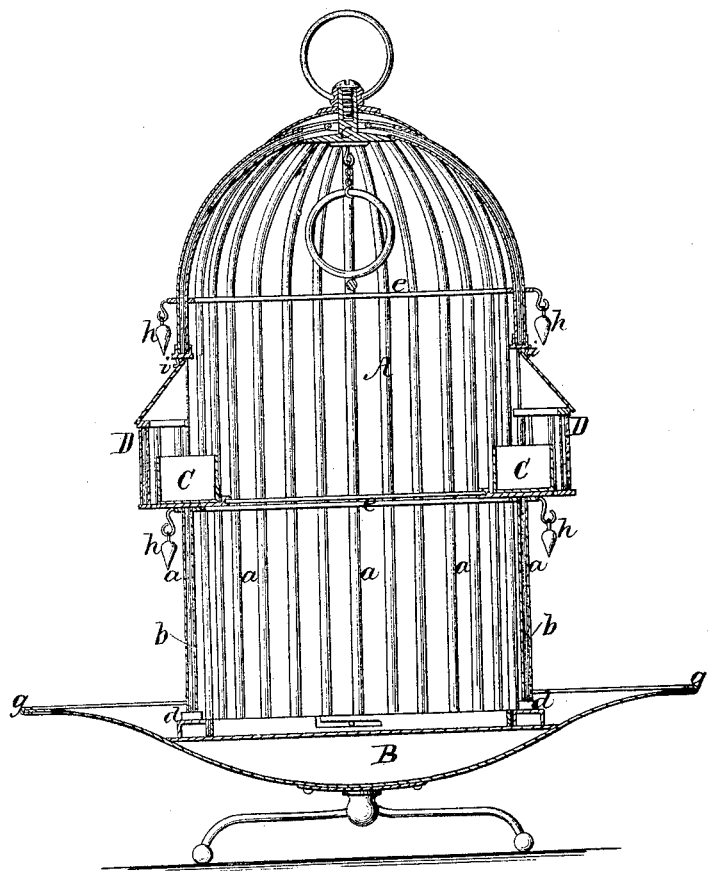
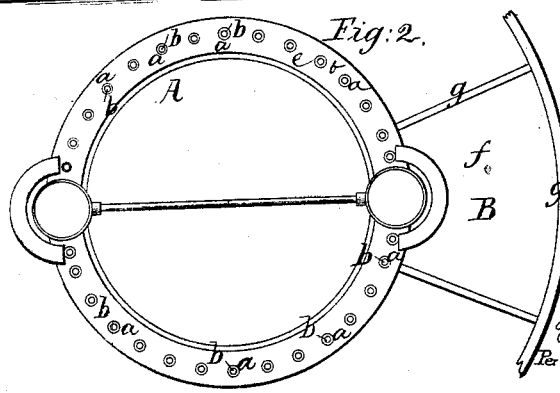

JOHN HARVEY WILLIAMS, OF NEW YORK, N. Y.

Letters Patent No. 90,619, dated May 25, 1869.

IMPROVED BIRD-CAGE.

The Schedule referred to in these Letters Patent and making part of the same.

*To all whom it may concern:*

Be it known that I, JOHN HARVEY WILLIAMS, of the city, county, and State of New York, have invented a new and useful Improvement in the Manufacture of Bird-Cages; and I do hereby declare the following to be a full, clear, and exact description thereof, which will enable those skilled in the art to make and use the same, reference being had to the accompanying drawing, forming part of this specification, in which drawing—

Figure 1 represents a vertical central section of this invention.

Figure 2 is a horizontal section of the same.

Similar letters indicate corresponding parts.

This invention relates to a bird-cage, constructed of a series of glass tubes, provided with metal cores, and secured in rings of metal, horn, or other suitable material, in such a manner that a light, clear, and extremely pretty cage can be produced at a comparatively small cost, and that in the construction of such cage all paint can be avoided, and the health of the bird occupying the cage is preserved.

The dish of my cage is made of horn, prepared so as to be semi-transparent, and cut out in segments, which are united by a metal frame, in such a manner that a light, clean, and beautiful dish for a bird-cage is produced, which requires no paint, and which can readily be made in one or more colors.

From the rings, which serve to steady and retain the glass rods of my cage, I have suspended a series of pendants, made of glass or horn, whereby the appearance of the cage is materially improved, and the bird occupying the cage is rendered proud of its dwelling.

The feed-cups are covered by protectors, hinged at the top, so that they can be readily swung open from the outside to get access to the feed-cups, while it requires considerable pressure to swing them open from the inside, since their lower portions are covered by the cups, and power can be applied to them only close to their hinges.

In the drawing—

The letter A designates a bird-cage, which is constructed of a series of glass tubes, $a$, strengthened by metallic cores $b$, which extend clear through the tubes, and serve to secure the same, at their upper ends, to the top $c$, and at their bottom ends to the annular base $d$.

Said glass rods pass through two or more rings $e$, which serve to steady them, and to retain the same at their required distances apart.

My glass rods are either plain or twisted, and they can be easily made in a great variety of colors, so that a cage can be constructed, which requires no paint or other matter that might be injurious to the health of the bird occupying the cage, and, at the same time, my cage produces a very good appearance, and it is light, and easily kept clean.

The cage A is supported by a dish, B, to which it is attached by an ordinary bayonet-fastening, or by any other suitable means, so that it can be readily detached whenever it may be desirable to clean the dish.

Said dish is made of horn, which is prepared so as to be semi-transparent, and which can be made in a variety of colors. It is cut out in a series of segments, $f$, which are secured in a metal frame, $g$, as shown in fig. 2.

By constructing the dish B of semi-transparent horn, I am enabled to produce an article which can be made in a great variety of colors, without the use of paint, and which can be readily kept clean, and materially assists in giving to my cage a beautiful appearance.

When hung up in the sun, my dish produces a beautiful effect.

From one or both the rings $e$, which serve to steady the glass rods of my cage, I have suspended a series of pendants, $h$, made of glass or horn in various colors. By these pendants, the appearance of my cage is materially improved, and, furthermore, said pendents may serve as playthings for the bird occupying the cage, so that the spirit and liveliness of said bird are kept up.

The feed-cups C are placed on platforms supported by the lower ring $e$, and they are covered from the outside by protectors D, which are connected to the cage A by means of hinge-joints $i$, applied to their tops, so that they can be easily swung up from the outside, where power can be applied at their bottom ends, but it requires considerable pressure to raise them from the inside, where power can only be applied to them close to the hinge-joints, their lower portions being covered up by the feed-cups. My protectors, therefore, cannot be pushed open by the bird occupying the cage, while they allow ready access to the feed-cups from the outside.

What I claim as new, and desire to secure by Letters Patent, is—

1. A bird-cage, constructed of glass tubes $a$, with metal cores $b$, in combination with the top $c$, annular base $d$, and guide-rings $e$, all as shown and described.

2. The dish B of a bird-cage, constructed of segments $f$ of horn, secured in a metallic frame, $g$, as shown and described.

JOHN HARVEY WILLIAMS.

Witnesses:
W. HAUFF,
ERNEST F. KASTENHUBER.